UNITED STATES PATENT OFFICE.

WILLIAM E. CARSON, OF RIVERTON, VIRGINIA.

CALCAREOUS CEMENTITIOUS MATERIAL AND PROCESS OF MAKING THE SAME.

1,248,455.  Specification of Letters Patent.  Patented Dec. 4, 1917.

No Drawing.  Application filed January 27, 1917.  Serial No. 145,029.

*To all whom it may concern:*

Be it known that I, WILLIAM E. CARSON, a citizen of the United States, residing at Riverton, in the county of Warren and State of Virginia, have invented certain new and useful Improvements in Calcareous Cementitious Materials and Processes of Making the Same, of which the following is a specification.

This invention relates to calcareous cementitious materials and processes of making the same; and it comprises as a new material a body or mass of dry calcareous cementitious material, which may be Portland cement, natural cement, plaster or lime, composed of very fine particles, these particles however being of two grades of fineness and a substantial proportion of the particles being of one grade of fineness and the residue of the particles being of quite another grade of fineness; and it further comprises a method of producing such material wherein a commercial calcareous cementitious material, such as Portland cement, existing in the ordinary commercial fineness of particles, say, 80 to 150 mesh, is further ground to a very much greater fineness, say, so that 90 per cent. or so will pass a 200 mesh sieve or even finer, and this fine ground material is then intermingled with a substantial amount of material of the original fineness, the portion of the material so intermingled with the fine ground material being either the same material as that used for the fine grinding or being another grade of material; it being however regarded as more advantageous to fine grind one lot of material and intermingle it with another lot of material of the original fineness but of a somewhat different analysis; all as more fully hereinafter set forth and as claimed.

Ordinary Portland cement and the like materials known as slag cement, natural cement, Rosendale cement, etc., are made in a well known way and are fine ground to produce the well known powder of almost impalpable fineness. It is a well recognized fact that the finer the grinding the better, for most purposes, is the resulting cement and it is the effort in all commercial cement manufacture to make a product of the utmost fineness consistent with operating conditions. The tendency in the cement art is always toward rather fine grinding of the material. In so grinding the material however, it is the effort to make all of it of the same high degree of fineness.

In producing plaster, gypsum is roasted or baked in a well known way and the material reduced to a fine powder. The plaster (plaster of Paris) is sold as such, or after admixture with various other materials, as various commercial plastics, such as the well-known "Keene's cement."

Lime occurs on the market in several fine ground forms. Quick-lime is marketed as a fine powder, sometimes as fine as 100 mesh. Dry slaked lime, that is lime which has been slaked with enough water to hydrate all the lime present, and as far as possible the magnesia, is found on the market for plastering and other purposes. The fineness of grain of these dry slaked pulverulent limes varies with each manufacturer; but the higher grades are all quite fine; say up to 100 mesh. Some of these fine-ground lime preparations are of pure lime ("high calcium lime") while others, made from dolomite or magnesian limestones, are high in magnesia.

With Portland cement and with these other calcareous cementitious materials, as with any other plastic material, it is desirable to obtain as high a degree of plasticity as possible. For the present purposes, plasticity may be defined as the property possessed by many, but not all, pulverulent materials on admixture with water, of giving masses or bodies which may be molded to shape; and the degree of plasticity is the extent to which such a mixture will allow incorporation of sand or other inert materials without losing these properties. In the case of cement, plasticity is of the utmost importance, since upon it depends the soundness of the concrete. The wet cement under the pressure of the molding operation must be forced into all the interstices and voids in the aggregate and it must go into all the angles and recesses of the mold. This is necessary whether the concrete is used for paving, for blocks, or for building; in all uses the wet cement must, so to speak, flow under pressure; it must be plastic and the mixture must not lose its plasticity by incorporation of sand. With plaster, high plasticity is even more important since it must spread well under the trowel in surfacing ceilings and walls and it must be readily troweled to a fine finish. The same is true of the dry hydrated limes where they are used, as much as the product is, for plastering purposes. In making mortar, high plasticity is important with these limes for the same reasons as in the case of cement.

I have found that for some reason, in making plastics of fine particled materials and water, it is of distinct advantage to have a variety of grain or particle sizes; that plasticity is higher with a material having particles of two orders of size than it is with either material of either grain size alone. And I have found that this principle applies to these calcareous cementitious materials.

I find that if I take ordinary fine ground or otherwise comminuted Portland or other cement and still further grind the powder so as to obtain a still finer material, I increase the plasticity. This is well known. It is well known that the further cement is ground, the better as a plastic it is. But, and quite unexpectedly, I have found that if this material produced by what I may term a secondary grinding be now admixed with some of the original unground cement, the plasticity is much enhanced. This is an unexpected result for the reason that it was not to be foreseen that an admixture of relatively coarse cement particles with fine ground cement particles would greatly heighten the plasticity of the latter; would give a plasticity of the mixture in which plasticity was more than the average of the plasticity of the coarse cement and of the finer cement respectively. But it is a fact that by further fine grinding of, say, half of a lot of any commercial cement, and then mixing the fine ground material with the reserved half of the cement, a better material is produced as regards plasticity than if all the cement had been fine ground to the same degree. The mixture of fine ground cement and of relatively coarse ground cement is better than either. It is better as regards plasticity which is the all-important characteristic of cement.

While as stated, I may simply fine grind one portion of a lot of cement and mix it with the rest of the cement in an unground condition, I find that I obtain still better results by mixing two grades of commercial cement of different analyses together, one such lot being fine ground to an extreme degree prior to making the mixture.

I produce a more plastic article of gypsum or plaster in exactly the same way. I may take any commercial plaster of very fine grain and regrind a portion of it to a much finer grain and then remix with the reserved portion. Or I may take two commercial grades of widely different particle fineness and simply mix them. It is however always better to fine grind some of the commercial plaster to a much finer grain than that ordinarily existing and then mix it with the commercial material, either the same material as that reground or another commercial brand of the same.

In the case of dry hydrated limes the same principles and methods of operation apply. I may take any fine commercial dry hydrated lime and regrind a portion of it and mix the reground material with the original material.

The proportions in which finer ground material is to be mixed with original material will differ to some extent with each particular preparation employed. But as a general rule I find that about equal parts of commercial fine powdered material and of the same material reground to about, say 200 or 250 mesh make an excellent article.

What I claim is:—

1. The process of improving the plasticity of commercial fine ground cement which comprises admixing such cement with a portion of cement ground to a much greater fineness.

2. The process of improving the plasticity of commercial fine ground cement which comprises fine grinding commercial cement to a very great fineness and mixing the product with ordinary commercial cement of less fineness, said latter cement being of a different analysis than the cement so fine ground.

3. The process of improving the plasticity of commercial fine ground calcareous cementitious material which comprises admixing such calcareous cementitious material with a portion of calcareous cementitious material ground to a much greater fineness.

4. The process of improving the plasticity of commercial fine ground calcareous cementitious material which comprises fine grinding commercial calcareous cementitious material to a very great fineness and mixing the product with ordinary commercial calcareous cementitious material of less fineness, said latter material being of a different analysis than the material so fine ground.

5. As a new composition of matter, a dry calcareous cementitious material composed of particles of two orders of magnitude; the particles of one order of magnitude being substantially of the fineness of the commercial material while the particles of the other order of magnitude are much finer.

6. As a new composition of matter, dry commercial cement composed of particles of two orders of magnitude; the particles of one order of magnitude being substantially of the fineness of commercial cement while the particles of the other order of magnitude are much finer.

In testimony whereof, I affix my signature.

WILLIAM E. CARSON.

Copies of this patent may be obtained for five cents each, by addressing the "Commissioner of Patents, Washington, D. C."